(12) United States Patent
Zhang et al.

(10) Patent No.: US 11,284,022 B2
(45) Date of Patent: Mar. 22, 2022

(54) DRIVER MECHANISM FOR ROLLING SHUTTER SENSOR TO ACQUIRE STRUCTURED LIGHT PATTERN

(71) Applicant: Ambarella International LP, Santa Clara, CA (US)

(72) Inventors: Zhe Zhang, Shanghai (CN); Long Zhao, Shanghai (CN); Zhikan Yang, Shanghai (CN); Ruian Xu, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/996,114

(22) Filed: Aug. 18, 2020

(65) Prior Publication Data

US 2022/0046194 A1 Feb. 10, 2022

(30) Foreign Application Priority Data

Aug. 7, 2020 (CN) .......................... 202010787058.0

(51) Int. Cl.
*H04N 5/353* (2011.01)
*H04N 13/106* (2018.01)
*H04N 5/33* (2006.01)
*H04N 5/3745* (2011.01)

(52) U.S. Cl.
CPC ............. *H04N 5/3532* (2013.01); *H04N 5/33* (2013.01); *H04N 5/3745* (2013.01); *H04N 13/106* (2018.05)

(58) Field of Classification Search
None
See application file for complete search history.

(56) References Cited

U.S. PATENT DOCUMENTS

| | | | |
|---|---|---|---|
| 2018/0130324 A1* | 5/2018 | Yu | G06K 9/00295 |
| 2020/0280659 A1* | 9/2020 | Galor Gluskin | H04N 5/3535 |
| 2020/0355494 A1* | 11/2020 | Rossi | G02B 27/425 |
| 2020/0382762 A1* | 12/2020 | Meynants | H04N 5/378 |
| 2021/0264135 A1* | 8/2021 | Whitelaw | G06K 9/00288 |

* cited by examiner

*Primary Examiner* — James M Hannett
(74) *Attorney, Agent, or Firm* — Christopher P. Maiorana, PC

(57) ABSTRACT

An apparatus includes an RGB-IR rolling shutter image sensor, a structured light projector, and a control circuit. The control circuit may be configured to control an exposure time of the RGB-IR rolling shutter image sensor and a turn on time of the structured light projector to obtain a structured light pattern in images captured by the RGB-IR rolling shutter image sensor.

20 Claims, 11 Drawing Sheets

DRIVER MECHANISM FOR ROLLING SHUTTER SENSOR TO ACQUIRE STRUCTURED LIGHT PATTERN

This application relates to Chinese Application No. 202010787058.0, filed Aug. 7, 2020, which is incorporated by reference in its entirety.

FIELD OF THE INVENTION

The invention relates to 3D sensing systems generally and, more particularly, to a method and/or apparatus for implementing a driver mechanism for a rolling shutter sensor to acquire a structured light pattern.

BACKGROUND

Existing structured light 3D sensing solutions utilize a global shutter sensor to capture a structured light pattern. The cost of the global shutter sensor can be much higher than a rolling shutter sensor. In a global shutter, all of the pixels start exposure simultaneously. Another, less costly type of sensor is a rolling shutter sensor. In general, a rolling shutter sensor is not used for capturing a structured light pattern because each row (or line) of pixels start exposure at different times. If the structured light pattern cannot match the infrared (IR) frame simultaneously, the IR frame may only have half or less frame with the structured light pattern. Even when the structured light pattern is present, the pattern will not be clear enough because the projector only turns on for a very short time due to hardware limitations.

It would be desirable to implement a driver mechanism for a rolling shutter sensor to acquire a structured light pattern.

SUMMARY

The invention encompasses an aspect concerning an apparatus comprising an RGB-IR rolling shutter image sensor, a structured light projector, and a control circuit. The control circuit may be configured to control an exposure time of the RGB-IR rolling shutter image sensor and a turn on time of the structured light projector to obtain a structured light pattern in images captured by the RGB-IR rolling shutter image sensor.

In some embodiments of the apparatus aspect described above, the control circuit sets the exposure time of the RGB-IR rolling shutter image sensor longer than a predetermined value.

In some embodiments of the apparatus aspect described above, the control circuit is configured to receive a first signal from the RGB-IR rolling shutter image sensor, where the first signal is configured to provide at least one of an indication of when a last line of the RGB-IR rolling shutter image sensor begins a respective exposure time and information from which a start of the respective exposure time can be calculated using a predefined formula, and upon receiving the first signal, send a second signal to the structured light projector to turn on the structured light pattern for a predefined period of time. In some embodiments the control circuit comprises a timer and is configured to program the time to control an on-time of the structured light projector in response to the second signal.

In some embodiments of the apparatus aspect described above, the apparatus further comprises an image signal processing circuit configured to process images captured by the RGB-IR rolling shutter image sensor, where the image signal processing circuit splits image data received from the RGB-IR rolling shutter image sensor into color image data and infrared (IR) image data. In some embodiments comprising an image signal processing circuit, the color image data comprises at least one of RGB or YUV color space data, and the IR image data comprises one or more of monochrome image data and the structured light pattern. In some embodiments comprising an image signal processing circuit, the control circuit is further configured to analyze the IR image data to obtain 3D information for a field of view of the RGB-IR rolling shutter image sensor, and analyze the IR image data and the color image data to obtain one or more features in the field of view of the RGB-IR rolling shutter image sensor. In some embodiments, the control circuit is further configured to generate one or more control signals in response to analyzing the images captured by the RGB-IR rolling shutter image sensor, and control one or more features of a security system in response to the one or more control signals. In some embodiments where the control circuit is further configured to generate one or more control signals and control one or more features of a security system, the one or more features of the security system comprise one or more of a door lock, an alarm system, a controlled access system, and a payment system.

In some embodiments of the apparatus aspect described above, the apparatus comprises a low power camera.

In some embodiments of the apparatus aspect described above, the control circuit is configured to perform facial recognition and liveness determination.

In some embodiments of the apparatus aspect described above, the structured light projector comprises an array of vertical-cavity surface-emitting lasers configured to generate a laser light pattern and a lens configured to decompose the laser light pattern to a dense dot pattern array. In some embodiments where the structured light projector comprises an array of vertical-cavity surface-emitting lasers, the array of vertical-cavity surface-emitting lasers emits light having a wavelength in an 800 to 1000 nanometers range.

The invention also encompasses an aspect concerning a method of implementing a low-cost structured-light based 3D sensing system comprising setting an exposure time of an RGB-IR rolling shutter image sensor based on a predetermined value, when a last line of the RGB-IR rolling shutter image sensor begins a respective exposure time, sending a control signal to turn on a structured-light projector, and controlling an on-time of the structured-light projector.

In some embodiments of the method aspect described above, the method further comprises programming a timer to a predetermined period for the on-time of the structured-light projector and in response to receiving a signal from the RGB-IR rolling shutter image sensor indicating that the last line of the RGB-IR rolling shutter image sensor is starting the respective exposure time, triggering the timer to turn on the structured-light projector.

In some embodiments of the method aspect described above, the method further comprises programming a timer to a predetermined period for the on-time of the structured-light projector, determining a trigger time for triggering the timer to turn on the structured-light projector in response a signal received from the RGB-IR rolling shutter image sensor providing information from which a start of the respective exposure time of the last line of the RGB-IR rolling shutter image sensor can be calculated using a predefined formula, and triggering the timer to turn on the structured-light projector at the determined trigger time.

In some embodiments of the method aspect described above, the method further comprises analyzing one or more images captured by the RGB-IR rolling shutter image sensor, generate one or more control signals in response to a result of analyzing the one or more images, and controlling one or more features of a security system in response to the one or more control signals. In some embodiments, analyzing the one or more images captured by the RGB-IR rolling shutter image sensor comprises applying an artificial neural network for at least one of face detection and facial recognition. In some embodiments applying an artificial neural network for at least one of face detection and facial recognition, the method further comprises controlling the one or more features of the security system in response to the facial recognition. In some embodiments applying an artificial neural network for at least one of face detection and facial recognition to control the one or more features of the security system, the one or more features of the security system comprise one or more of a door lock, an alarm system, a controlled access system, and a payment system.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
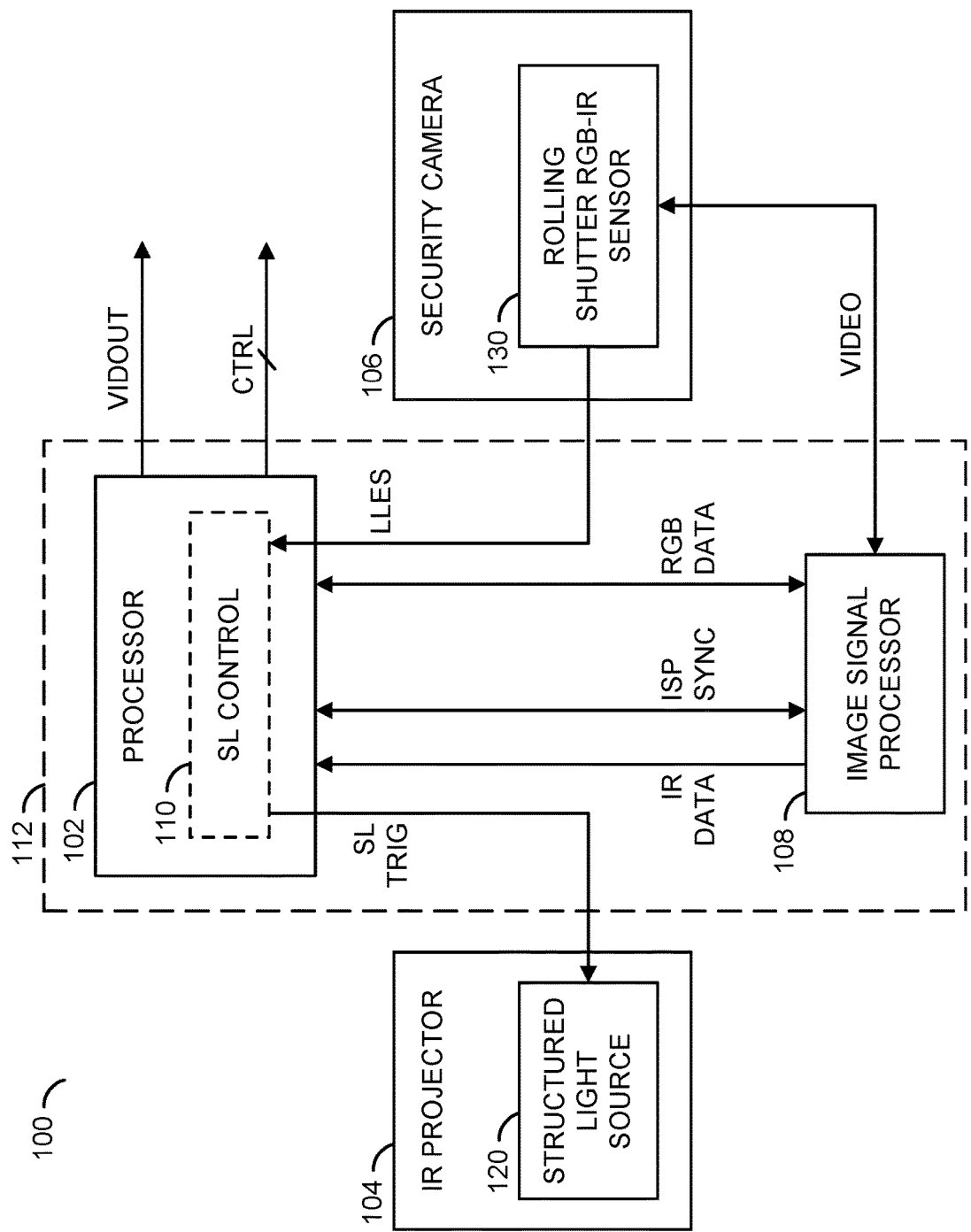
FIG. 1 is a diagram illustrating a rolling shutter sensor system in accordance with an example embodiment of the invention.

Embodiments of the present invention include providing a driver mechanism for a rolling shutter sensor to acquire a structured light pattern that may (i) control a shutter exposure time of the rolling shutter sensor, (ii) control a turn on time and duration of a structured light projector, (iii) ensure the exposure time of the rolling shutter sensor is longer than a predefined (or predetermined) value, (iv) utilize a signal (or interrupt) from the rolling shutter sensor as a trigger signal, (v) generate a separate signal in response to the trigger signal to control the structured light projector, (vi) utilize a timer to control the on time of the structured light projector, (vii) enable a structured light projector on-time greater than a predetermined time, (viii) have lower cost, (ix) provide greater flexibility for controlling structured light projector, (x) have reduced power consumption, (xi) be implemented in low-power and battery operated devices, (xii) be used to implement low cost structured light based 3D sensing systems, and/or (xiii) be implemented as one or more integrated circuits.

In various embodiments, a low cost 3D sensing platform may be provided. The low cost 3D sensing platform may facilitate development of intelligent access control systems and smart security products such as smart video doorbells and door locks, payment systems, alarm systems, etc. In various embodiments, the low cost 3D sensing platform may include a vision system on chip (SoC), a structured light projector, and a RGB-IR rolling shutter image sensor. In various embodiments, a single RGB-IR image sensor may be utilized to obtain both a visible light image and an infrared (IR) image. In various embodiments, the visible light image may be utilized for viewing, object (e.g., face, etc.) detection, object identification, and/or facial recognition. The infrared (IR) image may be utilized for depth sensing and liveness determination. In an example, the vision SoC may provide depth processing, anti-spoofing algorithms, structured light control, object detection/identification algorithms, 3D facial detection/recognition algorithms, and video encoding on a single chip. In an example, the vision SoC may generate one or more control signals in response to analyzing images captured by the RGB-IR rolling shutter image sensor. In an example, the vision SoC may control one or more features of a security system (e.g., a door lock, an alarm system, a controlled access system, a payment system, etc.) using the one or more control signals. In an example, the vision SoC may be configured to store and execute artificial neural networks (ANNs) implementing feature detection and extraction, object detection and identification, and facial detection and recognition. In an example, the ANNs may be stored (e.g., in a non-volatile computer readable storage medium) as directed acyclic graphs (DAGs) and corresponding weights.

In various applications, the low cost 3D sensing platform in accordance with embodiments of the invention may significantly reduce system complexity while improving performance, reliability, and security. In an example, the vision SoC in accordance with embodiments of the invention may include, but is not limited to, a powerful image signal processor (ISP), native support for RGB-IR color filter arrays, and advance high dynamic range (HDR) processing, which may result in exceptional image quality in low-light and high-contrast environments. In an example, the vision SoC in accordance with embodiments of the invention may provide an architecture that delivers computational power for liveness detection and 3D facial recognition, while running multiple artificial intelligence (AI) algorithms for advanced features such as people counting and anti-tailgating.

Referring to FIG. 1, a block diagram of an apparatus is shown illustrating an example implementation of a driver mechanism in accordance with an example embodiment of the invention. In an example, a system 100 may implement a 3D sensing platform including a driver mechanism for an RGB-IR rolling shutter sensor to acquire a structured light pattern. In an example, the system 100 may comprise a block (or circuit) 102, a block (or circuit) 104, a block (or circuit)

106, and/or a block (or circuit) 108. The circuit 102 may be implemented as a control circuit (e.g., dedicated circuitry, embedded controller, processor, microprocessor, etc.). The circuit 104 may implement an infrared structured light projector. The circuit 106 may implement a security/surveillance camera (or module). The circuit 108 may implement an image signal processing (ISP) circuit (or processor or frontend). In an example, the circuit 108 is generally capable of performing multiple channel ISP.

In an example, the circuit 102 may include a block (or circuit) 110. The block 110 may implement a structured light (SL) control circuit (or function). In another example, the circuits 102 and 110 may be implemented as separate circuit cores than may be instantiated on a single integrated circuit substrate (or die) or in a multi chip module (MCM). In an example, the circuits 102 and 108 (and the circuit 110 when separate from the circuit 102) may be implemented in a single integrated circuit or system-on-chip (SOC) 112.

In various embodiments, the circuit 102 may be connected to the IR structured light projector 104, the camera 106, and the ISP circuit 108. The camera 106 may also be connected to the ISP circuit 108. In an example, the circuit 102 generally provides a central control mechanism to synchronize timing of the IR projector 104 and the camera 106. In an example, the circuit 102 may be configured to calculate and maintain a predefined timing model to control a structured light source 120 of the IR projector 104. In an example, the circuit 102 may be further configured to control an exposure time of a rolling shutter sensor 130 of the camera 106. In an example, the circuit 102 may be further configured to control the ISP circuit 108 for synchronization with the output of the camera 106. In various embodiments, the circuit 102 may be configured to generate one or more video output signals (e.g., VIDOUT) and one or more control signals (e.g., CTRL). In an example, the one or more control signals CTRL may be used to control features (or operations) of one or more devices that are external to the circuit 102 and/or the SoC 112.

In some embodiments, the circuit 106 may be configured to present a signal (e.g., LLES). The signal LLES may indicate (or provide information facilitating calculation using a predefined formula of) when a last row (or line) of the rolling shutter sensor 130 begins exposure. In one example, a flash pin of the rolling sensor 130 may be configured to generate the signal LLES. In another example, other sensor signals from the circuit 106 may be used to calculate when the last line starts exposure (e.g., using a predefined formula, etc.). The signal LLES from the circuit 106 may be utilized by the circuit 110 to control the circuit 104. In another example, the signal LLES may be configured to generate an interrupt in response to the last row of the rolling sensor 130 beginning exposure. The interrupt may cause the circuit 110 to start a predefined turn-on period of the structured light source 120 of the IR projector 104. In an example, the circuit 110 may be configured to program a timer with the predefined turn-on period. In response to receiving the signal LLES, the circuit 110 may start the timer to turn on the structured light source for the predefined period of time.

In an example, the circuit 102 may have an input that may receive the signal LLES, a first input/output that may communicate via a signal (e.g., ISP SYNC) with a first input/output of the circuit 108, a second input/output that may communicate a first image channel (e.g., RGB DATA) with a second input/output of the circuit 108, a third input/output that may communicate a second image channel (e.g., IR DATA) with a third input/output of the circuit 108, a first output that may present a signal (e.g., SL_TRIG), a second output that may present the one or more video output signals VIDOUT, and a third output that may present the one or more control signals CTRL. In an example, the circuit 104 may have an input that may receive the signal SL_TRIG. The circuit 104 may be configured to generate a structured-light pattern based on the signal SL_TRIG.

In an example, the circuit 106 may have an output that may present the signal LLES (or another signal communicating information that can be used to calculate the start time of LLES) and an input/output that may communicate a signal (e.g., VIDEO) to a fourth input/output of the circuit 108. In an example, the signal VIDEO may communicate four channels (e.g., R, G, B, and IR) of video pixel information to the circuit 108. In an example, the circuits 106 and 108 may also exchange control and/or status signals via the connection carrying the signal VIDEO.

In an example, the circuit 108 may be configured to split the four-channel RGB-IR video signal VIDEO received from the circuit 106 into separate IR and RGB image data channels. In an example, the circuit 108 may be configured to generate the first image channel RGB DATA and the second image channel IR DATA in response to the signal VIDEO. The first image channel RGB DATA generally comprises color image data. In an example, the color image data may comprise RGB or YUV color space data. In an example, the second image channel IR DATA may comprise monochrome image data. When the structured light pattern is projected by the circuit 104, the second image channel IR DATA generally comprises both IR image data and the structured light pattern projected by the circuit 104. When the structured light pattern is not projected by the circuit 104, the second image channel IR DATA generally comprises IR image data with no structured light pattern. When the structured light pattern is projected by the circuit 104, the first image channel RGB DATA generally comprises the structured light pattern projected by the circuit 104 also, and, therefore, is generally ignored.

In an example, the structured light pattern data carried by the second image channel IR DATA may be analyzed by the circuit 102 to obtain 3D (e.g., depth) information for the field of view of the camera 106. The circuit 102 may be further configured to make a liveness determination based upon the structured light pattern data carried by the second image channel IR DATA. In an example, the RGB (or YUV) data along with the IR data may be analyzed by the circuit 102 to discern (e.g., detect, identify, etc.) one or more features or objects in the field of view of the camera 106.

In an example, the circuit 110 may be configured to generate the signal SL_TRIG. The circuit 110 may implement a structured light control timing protocol in accordance with embodiments of the invention (described below in connection with FIGS. 8-12). In an example, the circuit 110 may be implemented in hardware, software (or firmware, microcoding, etc.), or a combination of hardware and software.

In an example, the circuit 120 may be implemented as a structured light source. In an example, the circuit 120 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern. The lens is generally configured to decompose the laser light pattern to a dense dot pattern array. In an example, the circuit 120 may implement a near infrared (NIR) light source. In various embodiments, the light source of the circuit 120 may be configured to emit light with a wavelength of approximately 940 nanometers (nm), which is not visible to the human eye. However, other wavelengths may be utilized. In an example, a wavelength in a range of approximately 800-1000 nm may be utilized. In an example, the circuit 120 may be configured to emit the structured light pattern in response to the signal SL_TRIG. In an example, a period and/or intensity of the light emitted by the circuit 120 may be controlled (e.g., programmed) by the circuit 102. In an example, the circuit 102 may configure the circuit 120 prior to asserting the signal SL_TRIG.

In an example, the circuit 130 may be implemented as a rolling shutter image sensor. In an example, the circuit 130 may be implemented as an RGB-IR rolling shutter complementary metal oxide semiconductor (CMOS) image sensor. In one example, the circuit 130 may be configured to assert the signal LLES in response to the last line (or row) of the sensor starting exposure. In another example, the circuit 130 may be configured to assert another signal that may be used to calculate the start of the exposure of the last line (or row) of the sensor using a predefined formula. In an example, the circuit 130 may be configured to generate the signal VIDEO. In an example, the circuit 130 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

Figure 2:
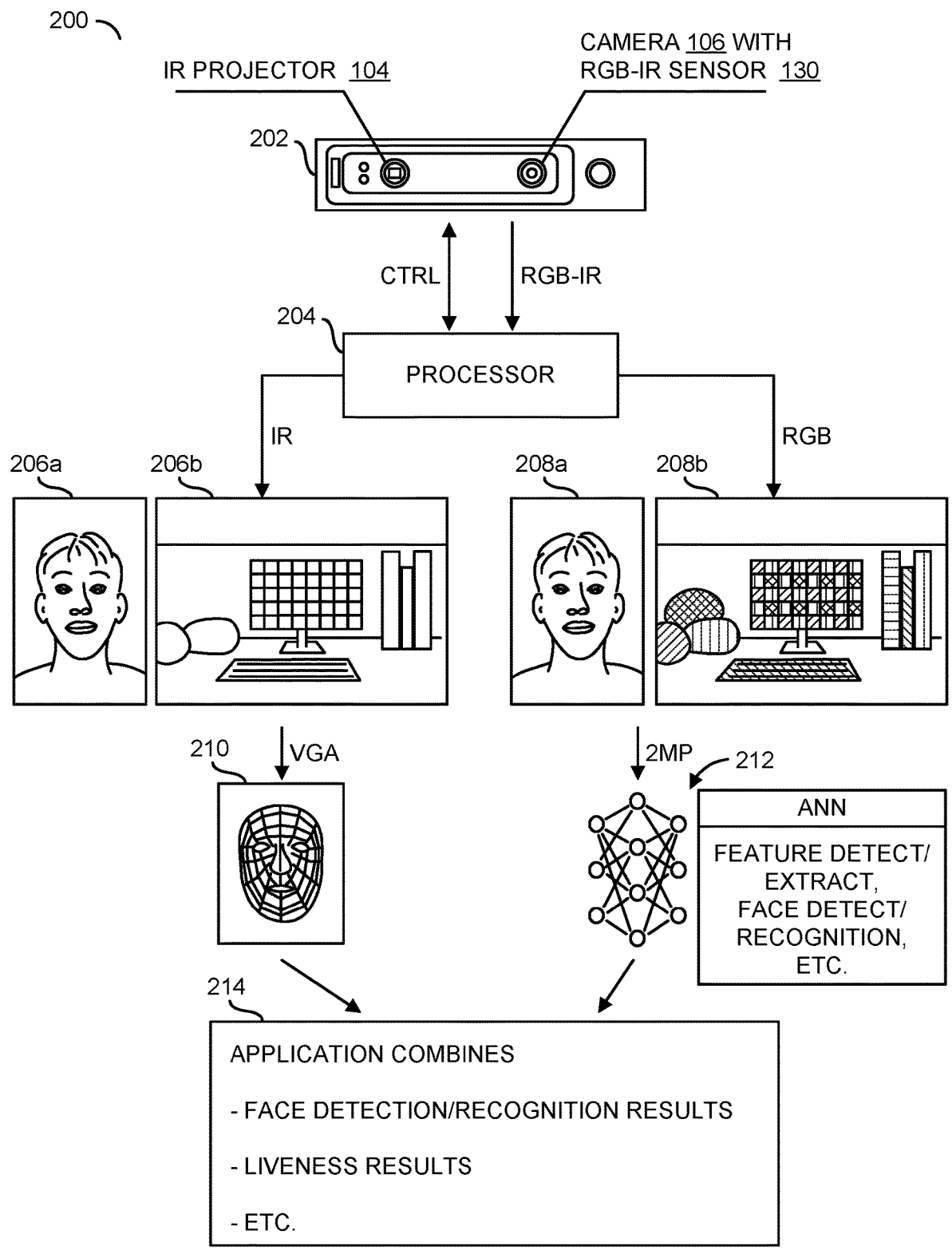
FIG. 2 is a diagram illustrating elements of a 3D sensing system in accordance with an example embodiment of the invention.

Referring to FIG. 2, a diagram is shown illustrating elements of a 3D sensing system in accordance with an example embodiment of the invention. In an example, a 3D sensing system 200 may include a housing 202 and a processor 204. The infrared (IR) structured light projector 104, including a first lens and the structured light source 130, and the camera 106, including a second lens and the single RGB-IR image sensor 130, may be mounted in the housing 202. The IR structured light projector 104 may be configured, when turned on, to project a structured light pattern on objects in the field of view of the camera 106. The RGB-IR sensor 130 may be used to acquire both IR image data (with and without the structured light pattern) and RGB image data for the objects in the field of view of the camera 106. The 3D sensing system 200 generally provides advantages over conventional two camera sensing systems. By utilizing only one RGB+IR rolling shutter sensor to obtain both RGB and IR image data with/without a structured light pattern, the 3D sensing system 200 generally reduces the system cost and the system complexity relative to conventional systems using global shutter sensors (e.g., one sensor and one lens versus two sensors and two lenses, and rolling shutter vs. global shutter).

In an example, the processor 204 may separate (split) the RGB-IR data from the RGB-IR sensor 130 into an IR image data channel and an RGB image data channel. In an example, the IR image data channel and/or the RGB image data channel may be processed by the processor 204 for 3D (e.g., depth) perception, liveness determination, object detection, face detection, object identification, and facial recognition. In an example, the IR image data channel with the structured light pattern present may be used to perform depth analysis and liveness determination. The IR image data without the structured light pattern present and the RGB image data channel may be used to perform object detection, face detection, object identification, and facial recognition.

In an example, depth analysis 210 may be applied to the IR image data channel when the structured light pattern is present (e.g., the IR projector 104 is turned on). The depth analysis 210 may be utilized also to make liveness determinations. In an example, the depth analysis 210 may be utilized to discern between an image 206a of a person and an image 206b of an inanimate object (e.g., a computer, etc.). In an example, both the IR image data channel when the structured light pattern is not present (e.g., the IR projector 104 is turned off) and the RGB image data channel may be used to perform object detection, face detection, object identification, and facial recognition.

In an example, the IR image data channel when the structured light pattern is not present (e.g., the IR projector 104 is turned off) and/or the RGB image data channel may presented as inputs to a neural network 212. In an example, the neural network 212 may comprise one or more neural network architectures including, but not limited to, a convolutional neural network (CNN), a deep-learning neural network (DNN), a fully connected neural network, etc. Neural networks, more properly referred to as "artificial" neural networks (ANNs), are computing systems made up of a number of simple, highly interconnected processing elements, which process information by respective dynamic state responses to external inputs. Neural networks are processing devices (algorithms or actual hardware) that are loosely modeled after the neuronal structure of a brain, but on much smaller scales. A large neural network may have hundreds or thousands of processing units.

Neural networks are typically organized in layers. The layers may comprise a number of interconnected nodes that perform an operation or activation function. Input data is presented to an input layer of the network, which communicates to one or more internal (or hidden) layers where the actual processing is performed via an arrangement of weighted connections. The process of determining the weights for the weighted connections of the neural network is typically referred to as training. The hidden layers connect to an output layer where the result of a prediction model implemented by the neural network is presented.

In an example, the neural network 212 may be configured (e.g., by design, through a training process, etc.) to obtain detection, recognition, and/or classification results in real time. In an example, in a low light (or night) environment the neural network 212 may utilize the IR image data channel to identify features of the person in the image 206a and/or identify the inanimate object (e.g., the computer, etc.) in the image 206b. In brighter (daytime) environments, the neural network 212 may utilize the RGB image data channel to render inferences based upon a color image 208a of the person or a color image 208b of the inanimate object (e.g., the computer, etc.). One or more applications 214 may utilize, alone or in combination, results of the depth analysis 210 and the neural network 212. In an example, the application(s) 214 may be run on the processor 204 or using distributed processing (e.g., cloud resources, etc.).

Figure 3:
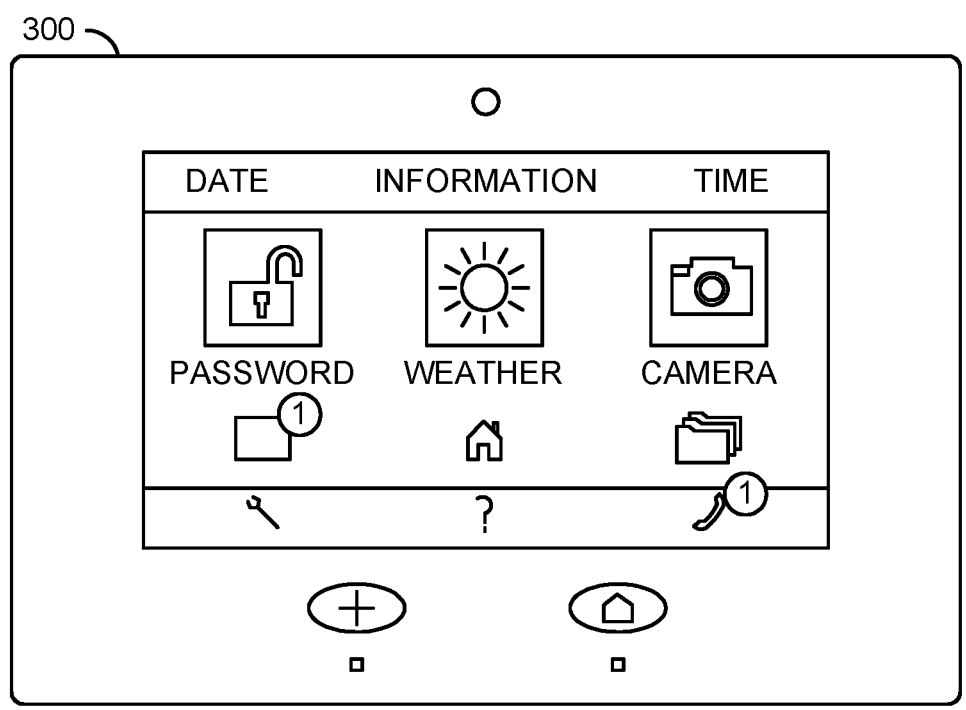
FIG. 3 is a diagram illustrating an example security panel providing a facial disarm feature.

Referring to FIG. 3, a diagram is shown illustrating an example security panel providing a facial disarm feature. In an example, a low cost 3D sensing system in accordance with an example embodiment of the invention may be implemented as part of a security panel 300. In an example, the security control panel 300 may be configured to limit access and/or permissions based on facial recognition. In an example, the 3D information may be used for 3D modeling and liveness determination and may be used to recognize particular users facially and automatically provide hands-free access (e.g., unlocking a door, disarming an alarm system, etc.). In an example, the 3D modeling and liveness determination may be used to recognize particular users and allow alarm system re-programming privileges based on facial identification (e.g., only person X or Y may be permitted to change access level or policy, add users, etc. even if the correct password is entered).

Figure 4:
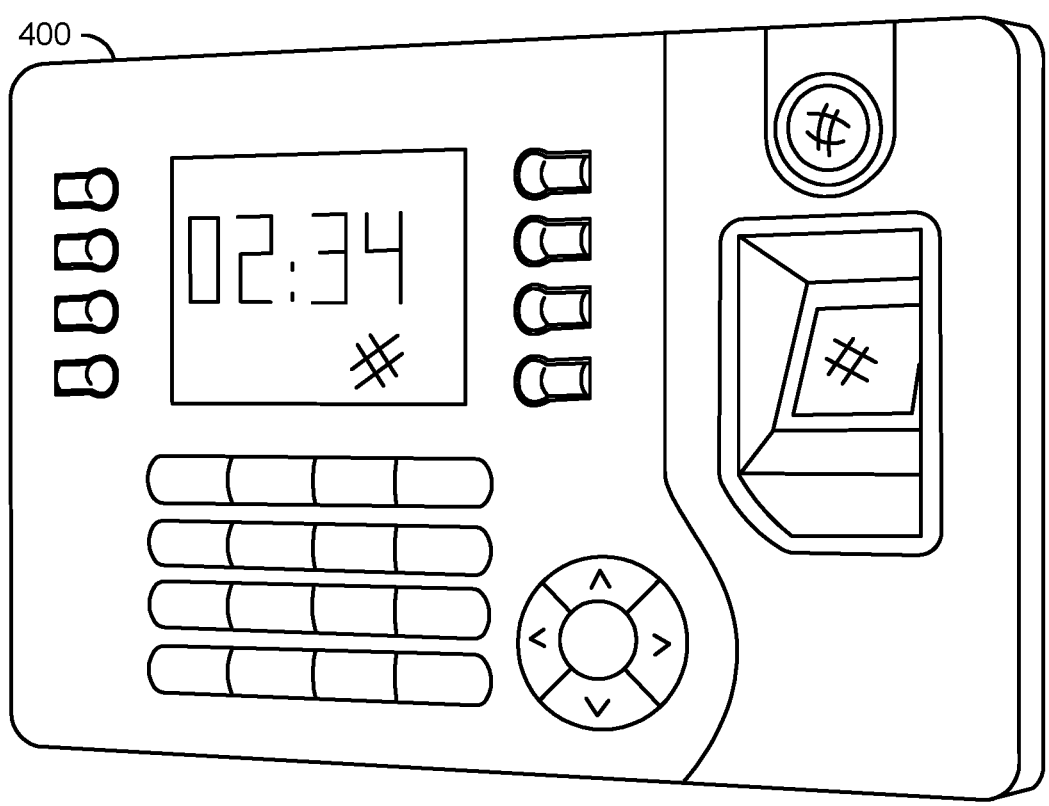
FIG. 4 is a diagram illustrating an example access control panel.

Referring to FIG. 4, a diagram is shown illustrating an example access control panel. In various embodiments, a low cost structured light based 3D sensing system comprising the apparatus 100 may be implemented as part of an access control panel 400. In an example, the 3D information may be used for 3D modeling and liveness determination. In an example, the low cost structured light based 3D sensing system may be used to gain access to a payment system (e.g., ATM, etc.), disarm an alarm system, and/or allow "tripwire" access to a restricted region (e.g., of a garden, a garage, a house, etc.). In one example, the low cost structured light based 3D sensing system may be configured to recognize a gardener/pool maintenance person and inhibit triggering an alarm. In another example, the low cost structured light based 3D sensing system may be configured to limit access to certain times and days of the week. In another example, the low cost structured light based 3D sensing system may be configured to allow alarm system re-programming privilege through the access control panel 400 based on video/audio identification (e.g., only person X or Y may be permitted to change access level or policy, add users, etc. even if the correct password is entered).

Figure 5:
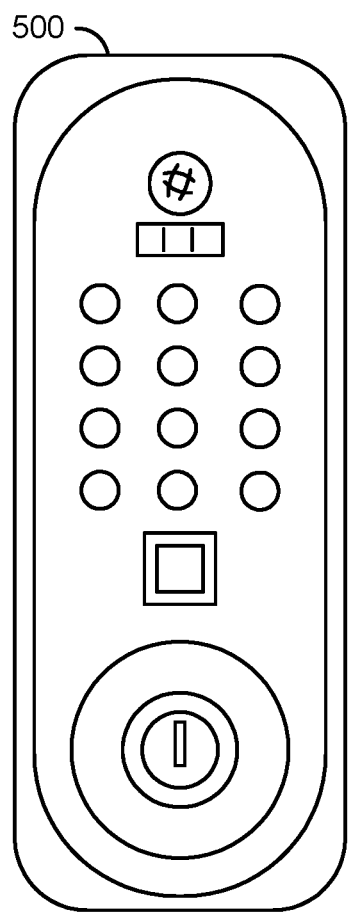
FIG. 5 is a diagram illustrating an example access control panel using a password.

Referring to FIG. 5, a diagram is shown illustrating an example access control panel using a password. In various embodiments, a low cost structured light based 3D sensing system comprising the apparatus 100 may be implemented as part of a security keypad 500. In an example, the security keypad 500 may be configured to limit access and/or permissions based on facial recognition. In an example, the 3D information may be used for 3D modeling and liveness determination and may be used to recognize particular users and allow access, alarm system disarm privileges, alarm system programming privileges, and/or alarm system re-programming privileges based on facial identification. In an example, only a known person (e.g., person X or Y) may be permitted to gain access or change access level or policy, add users, etc. even if the correct password is entered on the keypad 500.

Figure 6:
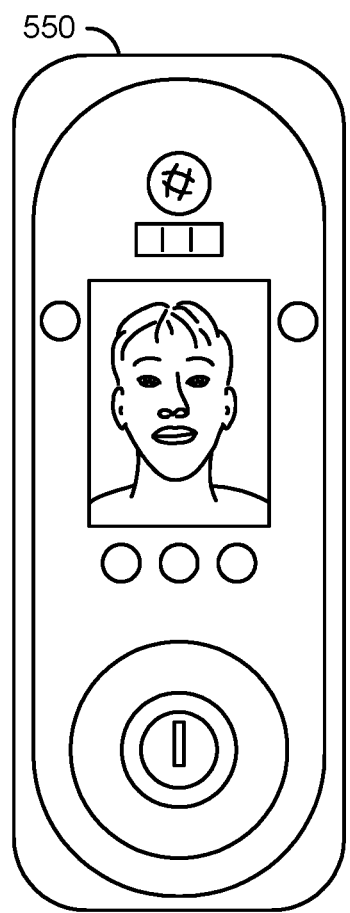
FIG. 6 is a diagram illustrating an example access control panel using a facial recognition.

Referring to FIG. 6, a diagram is shown illustrating another example access control panel 550 that may utilize the apparatus 100 for facial recognition.

Figure 7:
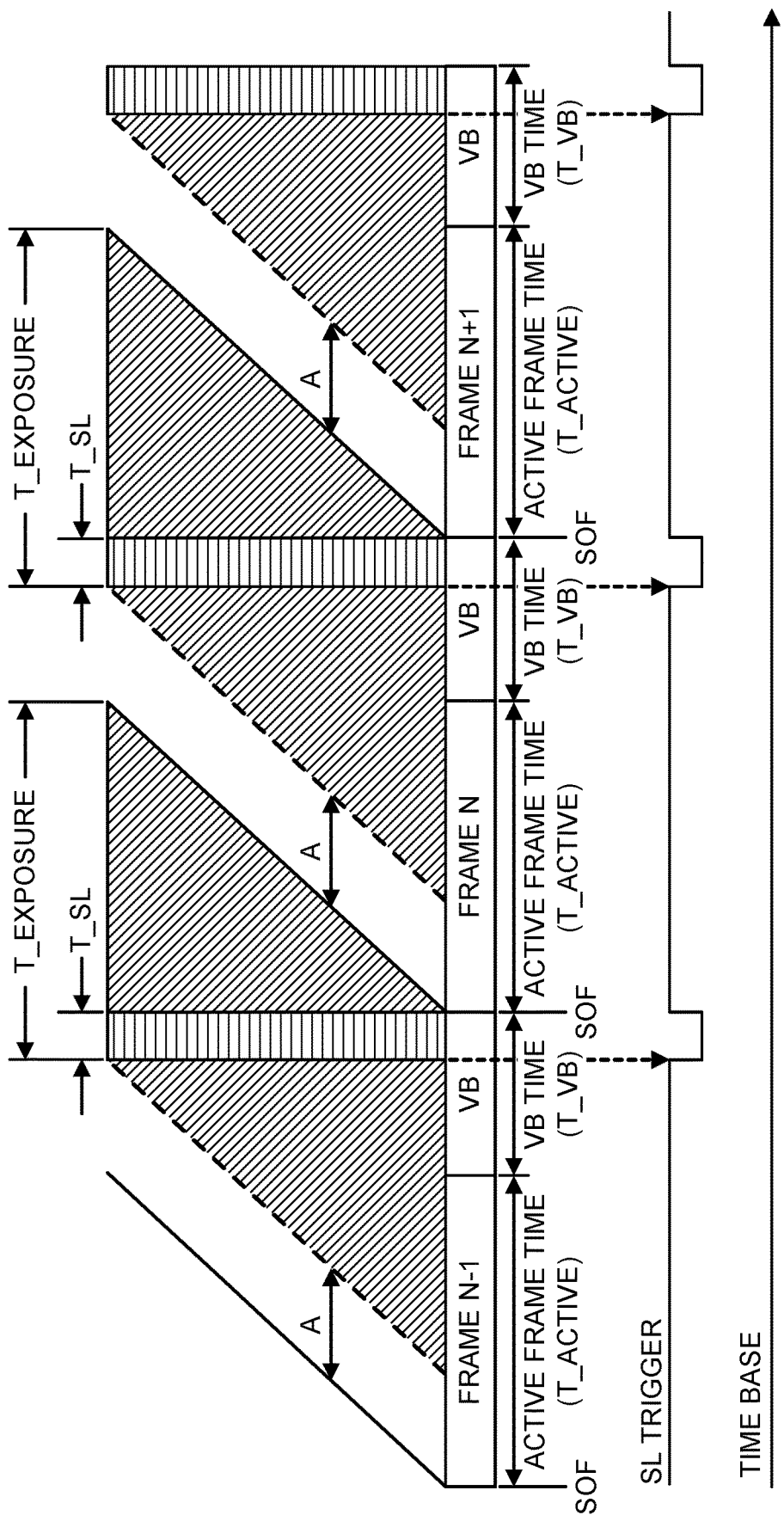
FIG. 7 is a diagram illustrating an example operation of a rolling shutter sensor system in accordance with an example embodiment of the invention.

Referring to FIG. 7, a diagram is shown illustrating an example operation of the apparatus 100 in accordance with an example embodiment of the invention. In an example, the structured light source 120 of the circuit 104 may operate similarly to a flash unit. In an example, the structured light source 120 may have a short ON time (e.g., less than a time of a vertical blanking (VB) period) and the RGB-IR rolling shutter sensor 130 may have a long exposure time (e.g., greater than an active frame time (T_ACTIVE)). The short ON time of the structured light source 120 generally results in a low average power consumption.

In an example, the block (or circuit) 110 may be configured based upon parameters and/or characteristics of the sensor used to implement the circuit 130. In an example, the parameters of the sensor 130 may include, but are not limited to, a start of frame (SOF), a frame time (T_FRAME), an active frame time (T_ACTIVE), a vertical blanking period duration (T_VB), an exposure time (T_EXPOSURE), a structured light on period of the structured light source 120 (T_SL), and reset/readout period (A). In an example, the block (or circuit) 110 may be configured to control the signal SL_TRIG according to the following equations.

$$T\_FRAME = T\_ACTIVE + T\_VB \quad \text{EQ. 1}$$

$$A = T\_FRAME - T\_EXPOSURE \quad \text{EQ. 2}$$

$$T\_SL = T\_FRAME - T\_ACTIVE - A \quad \text{EQ. 3}$$
$$= T\_VB - A = T\_EXPOSURE - T\_ACTIVE$$

where $$0 < T\_SL < T\_VB; \text{ and}$$

$$T\_ACTIVE < T\_EXPOSURE < T\_FRAME.$$

In an example, the signal SL_TRIG may be generated so that the structured light pattern on-time period T_SL is synchronized and falls within the vertical blanking period of the sensor 130. The structured light pattern on-time period T_SL generally overlaps a portion of the exposure (integration) time T_EXPOSURE when all rows of the sensor 130 are integrating.

Figure 8:
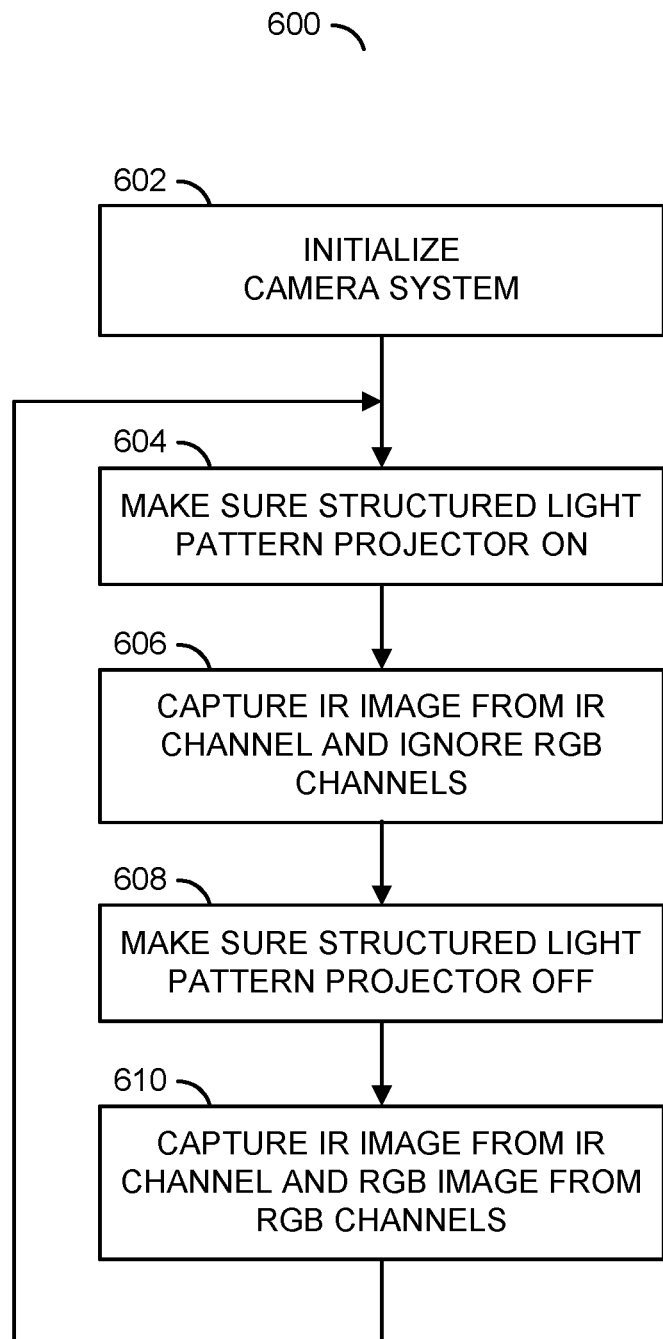
FIG. 8 is a flow diagram illustrating an example process in accordance with an example embodiment of the invention.

Referring to FIG. 8, a flow diagram is shown illustrating an example process that may be performed using the apparatus of FIG. 1. In an example, a process (or method) 600 may be implemented to generate a series (or sequence) of images for use in performing, inter alia, depth analysis, liveness determination, object detection, face detection, object identification, and/or facial recognition. In an example, the process 600 may comprise a step (or state) 602, a decision step (or state) 604, a step (or state) 606, a step (or state) 608, and a step (or state) 610. In the step 602, the process 600 may initialize the 3D sensing system 100. In the step 604, the process 600 may make sure the structured light projector is turned on. In the step 606, the process 600 may obtain an image containing a structure light pattern by capturing a frame of image data from an infrared (IR) image data channel and ignoring (dropping) image data from a color (RGB or YUV) image data channel. In the step 608, the process 600 may make sure the structured light projector is turned off. In the step 610, the process 600 may obtain one or more images without the structure light pattern by capturing one or more frames of image data from both the IR image data channel and the color image data channel. The process 600 may repeat the steps 604 through 610 continuously or for a predetermined period of time to obtain a series of images. In an example, the images captured in the step 606 may be used to perform depth and liveness determinations. In an example, the images captured in the step 610 may be used to perform object detection and identification including, but not limited to, face detection and facial recognition.

Figure 9:
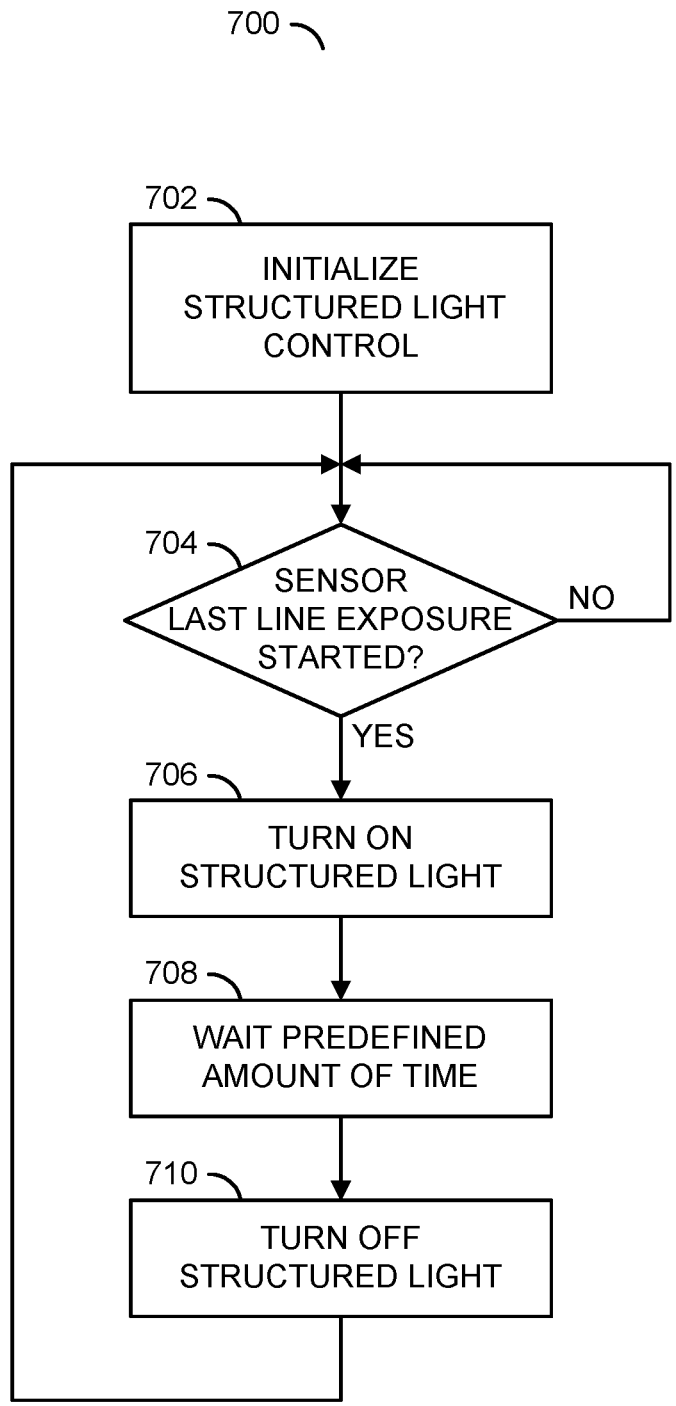
FIG. 9 is a flow diagram illustrating another example process in accordance with an example embodiment of the invention.

Referring to FIG. 9, a flow diagram is shown illustrating an example process that may be performed using the apparatus of FIG. 1 during the operation illustrated in FIG. 7. In an example, a process (or method) 700 may be implemented to generate the signal SL_TRIG. In an example, the process 700 may comprise a step (or state) 702, a decision step (or state) 704, a step (or state) 706, a step (or state) 708, and a step (or state) 710. In the step 702, the process 700 may initialize the structured light control circuit 110 with parameters (e.g., A, T_ACTIVE, T_FRAME, T_EXPOSURE, T_VB, etc.) of the sensor 130. In the decision step 704, the process 700 may check whether the last line of the sensor 130 has started exposure.

In one example, the RGB-IR sensor 130 may present an output signal (e.g., the signal LLES) indicating the last line of the RGB-IR sensor 130 has started exposure. In an example, the signal LLES may be the flash pin of the RGB-IR sensor 130. In another example, another signal (e.g., a system interrupt) from the RGB-IR sensor 130 may used to calculate (e.g., using a predefined formula) when the last line of the RGB-IR sensor 130 has started exposure. If the last line of the sensor 130 has not started exposure, the process 700 loops in the step 704. If the last line of the sensor 130 has started exposure, the process 700 may move to the step 706.

In the step 706, the process 700 may cause the circuit 110 to turn on the structured light pattern using the IR projector 104 and moves to the step 708. In the step 708, the process 700 waits for a predetermined delay period. When the delay period expires, the process 700 may move to the step 710 where the process 700 causes the circuit 110 to turn off the structured light pattern. The process 700 may then return to the decision step 704. In an example, the steps 706 through 710 may be implemented using a timer circuit triggered by a signal from the circuit 110 and programmed with the predetermined delay period.

Figure 10:
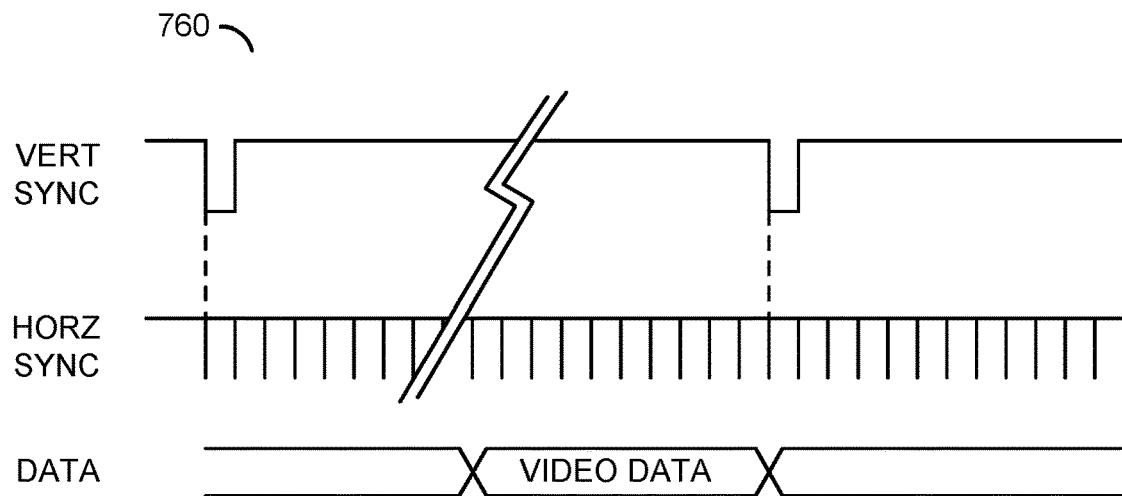
FIG. 10 is a diagram illustrating example implementations of an image sensor interface.
Figure 10:
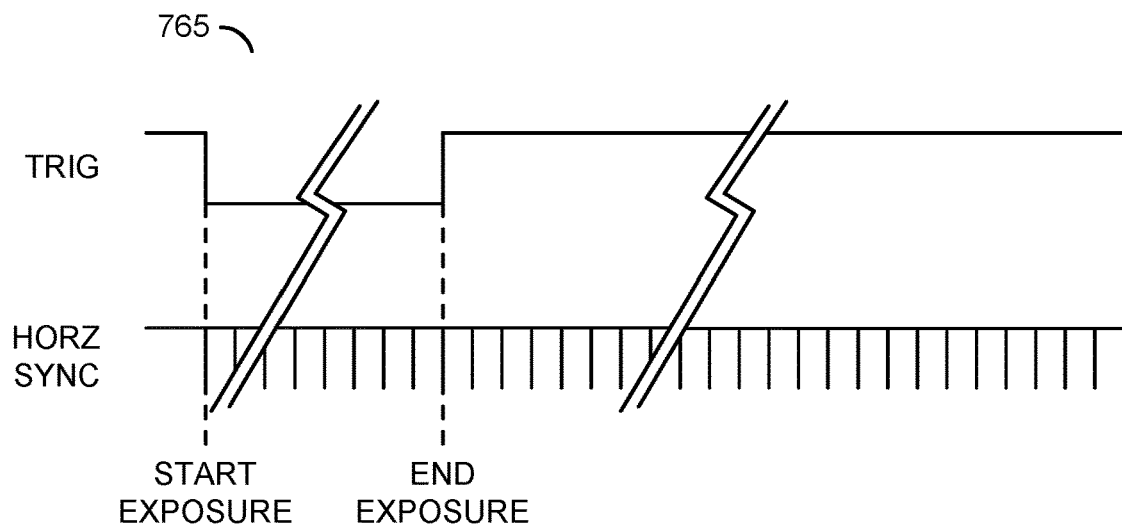
Figure 10:
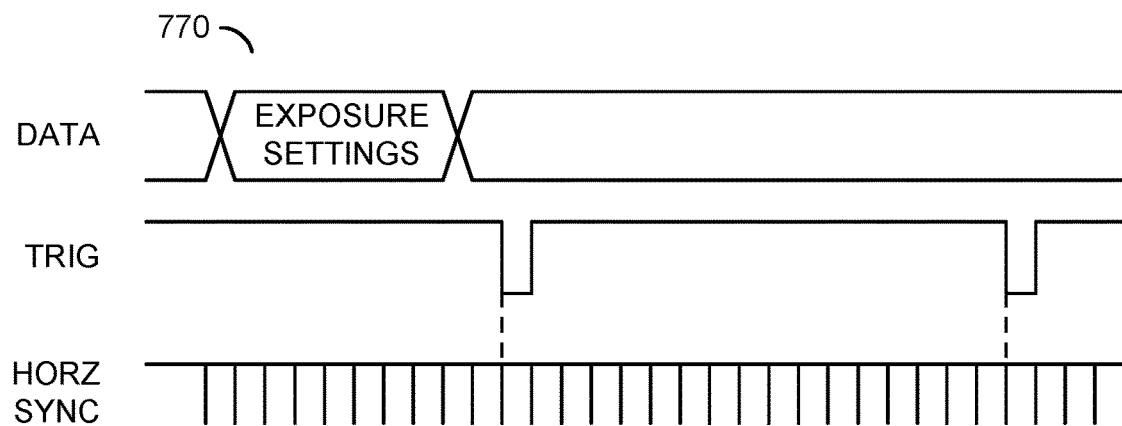

Referring to FIG. 10, a diagram is shown illustrating example implementations of a variety of image sensor interfaces. The example interfaces in FIG. 10 are illustrative and are not to be construed as intended to limit the manner in which the processor and image sensor may be coupled or communicate. In some embodiments, an interface 760 may be implemented between a processor and a CMOS image sensor. The interface 760 may comprise a vertical synchronization signal (e.g., VERT SYNC), a horizontal synchronization signal (e.g., HORZ SYNC), and a video data path. The signal VERT SYNC may be used to trigger a transfer of the image data from the pixel elements to the associated memory elements of the image sensor. The signal HORZ SYNC may be used to clock out the image data as a signal VIDEO DATA. A delay between assertion of the signal VERT SYNC and the beginning of the signal VIDEO DATA is generally determined by a design of the sensor. In embodiments implementing the interface 760, the exposure start is determined by the video modes, blanking periods, and related delays. The timing of the exposure window may be calculated from a timing diagram of the particular sensor and the IR illumination timed to occur after the exposure start time and within the exposure window.

In some embodiments, an interface 765 may be implemented between the processor and the CMOS image sensor. The interface 765 may comprise an exposure trigger signal (e.g., TRIG), a horizontal synchronization signal (e.g., HORZ SYNC), and a video data path (not shown). The signal TRIG may be used to control the length of the exposure window of the CMOS sensor and trigger a transfer of the image data from the pixel elements to the associated memory elements of the image sensor. When the signal TRIG is asserted (e.g., switched to a LOW state), the exposure window starts and the CMOS image sensor begins integration of the incident light. When the signal TRIG is de-asserted (e.g., switched to a HIGH state), the exposure window ends and the CMOS image sensor transfers the image data from the pixel elements to the storage elements. Similar to the interface 760, the signal HORZ SYNC may be used to clock out the image data as the signal VIDEO DATA. A delay between the signal TRIG being de-asserted and the beginning of the signal VIDEO DATA is generally determined by a design of the sensor. In embodiments implementing the interface 765, the exposure start and exposure window are determined by the signal TRIG. In some embodiments, the exposure window and IR illumination window may be set by configuration values stored in registers and/or configuration bits. The processor may implement control logic (e.g., software, firmware, circuitry) to calculate the timing of the IR structured light pattern to be synchronized with the signal TRIG. For example, the processor may use a first GPIO to control the integration on/off and a second GPIO to control the IR illumination on/off. In embodiments implementing the interface 765, the processor may implement real-time control for each frame.

In some embodiments, an interface 770 may be implemented between the processor and the CMOS image sensor. The interface 770 may comprise an exposure setting data path, an exposure trigger signal (e.g., TRIG), a horizontal synchronization signal (e.g., HORZ SYNC), and a video data path (not shown). The exposure window duration may be programmed by data (e.g., EXPOSURE SETTINGS) communicated to the image sensor via the exposure setting data path. The signal TRIG may be used to control the start of the exposure window of the CMOS sensor. Transfer of the image data from the pixel elements to the associated memory elements of the image sensor is controlled by the image sensor based upon the EXPOSURE SETTINGS data. When the signal TRIG is asserted (e.g., switched to a LOW state), the exposure window starts and the CMOS image sensor begins integration of the incident light. When the predetermined exposure/integration time ends, the CMOS image sensor transfers the image data from the pixel elements to the storage elements. Similar to the interface 760, the signal HORZ SYNC may be used to clock out the image data from the storage elements as the signal VIDEO DATA. A delay between the signal TRIG being asserted and the beginning of the signal VIDEO DATA may be calculated based on the EXPOSURE SETTINGS data and a timing diagram of the sensor. In embodiments implementing the interface 770, the exposure start and exposure window are determined by the signals TRIG and EXPOSURE SETTINGS. The processor generally includes control logic (e.g., software, firmware, circuitry) to calculate the timing of the IR pulse to be synchronized with the signal TRIG. For example, the processor may use a first GPIO or SIO to program the integration duration, a second GPIO to control assertion of the signal TRIG, the and a third GPIO to control the IR illumination on/off.

Figure 11:
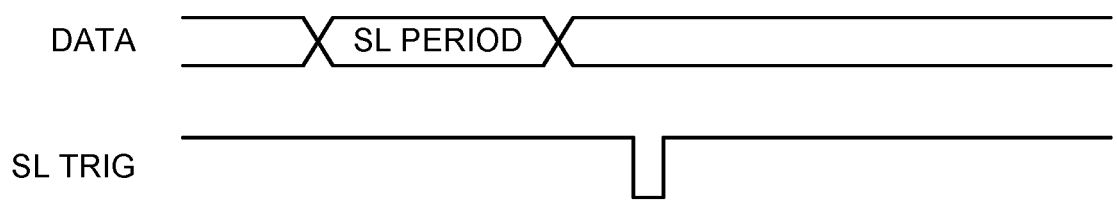
FIG. 11 is a diagram illustrating example implementations of a structured light projector interface.
Figure 11:
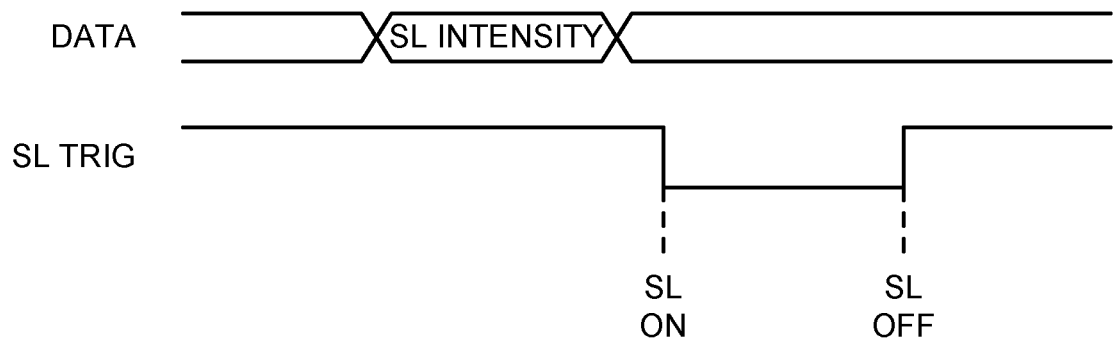

Referring to FIG. 11, a diagram is shown illustrating example implementations of a variety of IR light illumination interfaces. The example interfaces in FIG. 11 are illustrative and are not to be construed as intended to limit the manner in which the processor and IR projector may be coupled or communicate.

In some embodiments, an interface 780 may be implemented between the processor and the IR projector 104. The interface 780 may comprise an structured light (SL) period setting data path and an SL trigger signal (e.g., SL_TRIG). The duration of infrared illumination window (e.g., SL ON to SL OFF), corresponding to the time T_SL, and the IR light intensity may be programmed by data (e.g., SL PERIOD) communicated to the IR projector 104 via an IR illumination setting data path. The signal SL_TRIG may be used to control the start of the structured light period. When the signal SL_TRIG is asserted (e.g., switched to a LOW state), the IR illumination period starts and the IR light source may be switched on to emit the IR structured light pattern. When the predetermined SL period time ends, the IR light source may be switched off. The circuit 102 generally includes control logic (e.g., software, firmware, circuitry) to calculate the timing of the SL illumination to be synchronized with the exposure window of the CMOS image sensor. For example, the circuit 102 may use a first GPIO (general purpose input/output) or SIO (serial input/output) to program the IR projector 104 duration and intensity, and a second GPIO to control assertion of the signal SL_TRIG.

In some embodiments, an interface 785 may be implemented between the circuit 102 and the IR projector 104. The interface 785 may comprise an IR illumination setting data path and an SL trigger signal (e.g., SL_TRIG). In an example, the intensity of the IR structured light projected may be programmed by data (e.g., SL INTENSITY) communicated to the IR projector 104 via the IR illumination setting data path. The signal SL_TRIG may be used to control the start and duration of the IR structured light illumination. When the signal SL_TRIG is asserted (e.g., switched to a LOW state), the IR structured light projection window starts. When the signal SL_TRIG is de-asserted (e.g., switched to a HIGH state), the IR structured light projection window ends and the IR light source is switched off. The circuit 102 generally includes control logic (e.g., software, firmware, circuitry) to calculate the timing of the IR structured light illumination period to be synchronized with the exposure window (e.g., T_EXPOSURE) of the CMOS image sensor. For example, the processor may use a first GPIO or SIO to program the IR structured light pattern parameters, and a second GPIO to control assertion of the signal SL_TRIG to control the IR illumination on/off.

Figure 12:
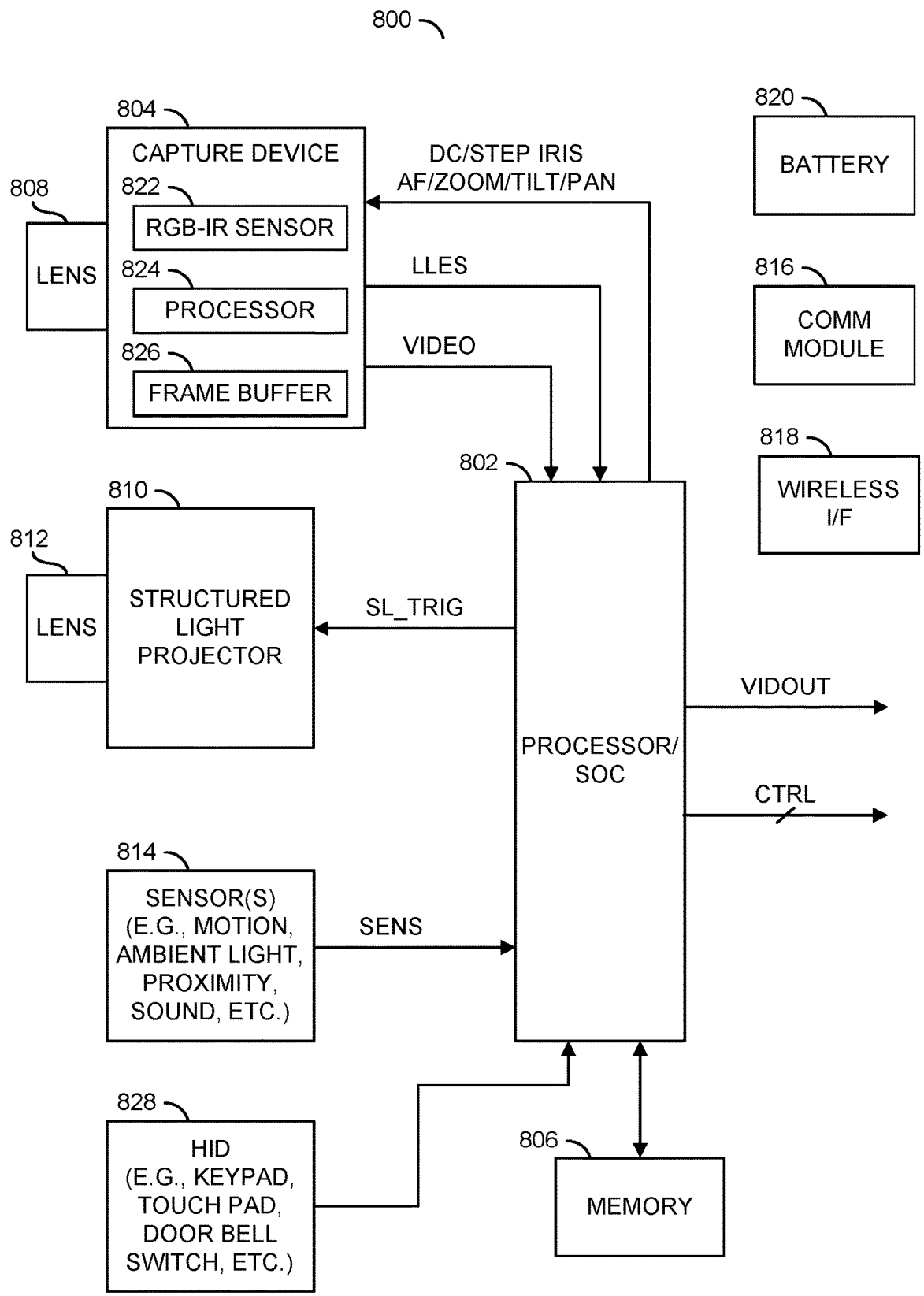
FIG. 12 is a diagram illustrating an apparatus in accordance with another example embodiment of the invention.

Referring to FIG. 12, a block diagram of a camera 800 is shown illustrating an example implementation. In an example, the camera 800 may comprise a block (or circuit) 802, a block (or circuit) 804, a block (or circuit) 806, a block (or circuit) 808, a block (or circuit) 810, a block (or circuit) 812, a block (or circuit) 814, a block (or circuit) 816, a block (or circuit) 818, and/or a block (or circuit) 820. The circuit 802 may be implemented as a processor and/or System on Chip (SoC). The circuit 804 may be implemented as a capture device. The circuit 806 may be implemented as a memory. The block 808 may be implemented as an optical lens. The circuit 810 may be implemented as a structured light projector. The block 812 may be implemented as a structured light pattern lens. The circuit 814 may be implemented as one or more sensors. The circuit 816 may be implemented as a communication device. The circuit 818 may be implemented as a wireless interface. The circuit 820 may be implemented as a battery 820. In some embodiments, the camera 800 may comprise the processor/SoC 802, the capture device 804, the memory 806, the lens 808, the IR structured light projector 810, the lens 812, the sensors 814, the communication module 816, the wireless interface 818, and the battery 820. In another example, the camera 800 may comprise the capture device 804, the lens 808, the IR structured light projector 810, the lens 812, and the sensors 814, and the processor/SoC 802, the memory 806, the communication module 816, the wireless interface 818, and the battery 820 may be components of a separate device. The implementation of the camera 800 may be varied according to the design criteria of a particular implementation.

The lens 808 may be attached to the capture device 804. In an example, the capture device 804 may comprise a block (or circuit) 822, a block (or circuit) 824, and a block (or circuit) 826. The circuit 822 may implement an image sensor. The image sensor 822 may be an RGB-IR rolling shutter image sensor. The circuit 824 may be a processor and/or logic. The circuit 826 may be a memory circuit (e.g., a frame buffer).

The capture device 804 may be configured to capture video image data (e.g., light collected and focused by the lens 808). The capture device 804 may capture data received through the lens 808 to generate a video bitstream (e.g., a sequence of video frames). In various embodiments, the lens 808 may be implemented as a fixed focus lens. A fixed focus lens generally facilitates smaller size and low power. In an example, a fixed focus lens may be used in battery powered, doorbell, and other low power camera applications. In some embodiments, the lens 808 may be directed, tilted, panned, zoomed and/or rotated to capture the environment surrounding the camera 800 (e.g., capture data from the field of view). In an example, professional camera models may be implemented with an active lens system for enhanced functionality, remote control, etc.

The capture device 804 may transform the received light into a digital data stream. In some embodiments, the capture device 804 may perform an analog to digital conversion. For example, the image sensor 822 may perform a photoelectric conversion of the light received by the lens 808. The processor/logic 824 may transform the digital data stream into a video data stream (or bitstream), a video file, and/or a number of video frames. In an example, the capture device 804 may present the video data as a digital video signal (e.g., VIDEO). The digital video signal may comprise the video frames (e.g., sequential digital images and/or audio).

The video data captured by the capture device 804 may be represented as a signal/bitstream/data VIDEO (e.g., a digital video signal). The capture device 804 may present the signal VIDEO to the processor/SoC 802. The signal VIDEO may represent the video frames/video data. The signal VIDEO may be a video stream captured by the capture device 804.

The image sensor 822 may receive light from the lens 808 and transform the light into digital data (e.g., the bitstream). For example, the image sensor 822 may perform a photoelectric conversion of the light from the lens 808. In some embodiments, the image sensor 822 may have extra margins that are not used as part of the image output. In some embodiments, the image sensor 822 may not have extra margins. In various embodiments, the image sensor 822 may be configured to generate an RGB-IR video signal. In an infrared light only illuminated field of view, the image sensor 822 may generate a monochrome (B/W) video signal. In a field of view illuminated by both IR light and visible light, the image sensor 822 may be configured to generate color information in addition to the monochrome video signal. In various embodiments, the image sensor 822 may be configured to generate a video signal in response to visible and/or infrared (IR) light.

The processor/logic 824 may transform the bitstream into a human viewable content (e.g., video data that may be understandable to an average person regardless of image quality, such as the video frames). For example, the processor/logic 824 may receive pure (e.g., raw) data from the image sensor 822 and generate (e.g., encode) video data (e.g., the bitstream) based on the raw data. The capture device 804 may have the memory 826 to store the raw data and/or the processed bitstream. For example, the capture device 804 may implement the frame memory and/or buffer 826 to store (e.g., provide temporary storage and/or cache) one or more of the video frames (e.g., the digital video signal). In some embodiments, the processor/logic 824 may perform analysis and/or correction on the video frames stored in the memory/buffer 826 of the capture device 804.

The sensors 814 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 814 may be configured to detect motion anywhere in the field of view monitored by the camera 800. In various embodiments, the detection of motion may be used as one threshold for activating the capture device 804. The sensors 814 may be implemented as an internal component of the camera 800 and/or as a component external to the camera 800. In an example, the sensors 814 may be implemented as a passive infrared (PIR) sensor. In another example, the sensors 814 may be implemented as a smart motion sensor. In embodiments implementing the smart motion sensor, the sensors 814 may comprise a low resolution image sensor configured to detect motion and/or persons.

In various embodiments, the sensors 814 may generate a signal (e.g., SENS). The signal SENS may comprise a variety of data (or information) collected by the sensors 814. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 802. In an example, the sensors 814 may generate (assert) the signal SENS when motion is detected in the field of view monitored by the camera 800. In another example, the sensors 814 may generate (assert) the signal SENS when triggered by audio in the field of view monitored by the camera 800. In still another example, the sensors 814 may be configured to provide directional information with respect to motion and/or sound detected in the field of view. The directional information may also be communicated to the processor/SoC 802 via the signal SENS.

The processor/SoC 802 may be configured to execute computer readable code and/or process information. In various embodiments, the computer readable code may be stored within the processor/SoC 802 (e.g., microcode, etc.) and/or in the memory 806. In an example, the processor/SoC 802 may be configured to execute one or more artificial neural network models (e.g., facial recognition CNN, object detection CNN, object classification CNN, etc.) stored in the memory 806. In an example, the memory 806 may store one or more directed acyclic graphs (DAGs) and one or more sets of weights defining the one or more artificial neural network models. The processor/SoC 802 may be configured to receive input from and/or present output to the memory 806. The processor/SoC 802 may be configured to present and/or receive other signals (not shown). The number and/or types of inputs and/or outputs of the processor/SoC 802 may be varied according to the design criteria of a particular implementation. The processor/SoC 802 may be configured for low power (e.g., battery) operation.

The processor/SoC 802 may receive the signal VIDEO and the signal SENS. The processor/SoC 802 may generate one or more video output signals (e.g., VIDOUT) and one or more control signals (e.g., CTRL) based on the signal VIDEO, the signal SENS, and/or other input. In some embodiments, the signals VIDOUT and CTRL may be generated based on analysis of the signal VIDEO and/or objects detected in the signal VIDEO. In various embodiments, the processor/SoC 802 may be configured to perform one or more of feature extraction, object detection, object tracking, and object identification. For example, the processor/SoC 802 may determine motion information and/or depth information by analyzing a frame from the signal VIDEO and comparing the frame to a previous frame. The comparison may be used to perform digital motion estimation. In some embodiments, the processor/SoC 802 may be configured to generate the video output signal VIDOUT comprising video data from the signal VIDEO. The video output signal VIDOUT may be presented to the memory 806, the communications module 816, and/or the wireless interface 818.

The memory 806 may store data. The memory 806 may implement various types of memory including, but not limited to, a cache, flash memory, memory card, random access memory (RAM), dynamic RAM (DRAM) memory, etc. The type and/or size of the memory 806 may be varied according to the design criteria of a particular implementation. The data stored in the memory 806 may correspond to a video file, motion information (e.g., readings from the sensors 814), video fusion parameters, image stabilization parameters, user inputs, computer vision models, and/or metadata information.

The lens 808 (e.g., camera lens) may be directed to provide a view of an environment surrounding the camera 800. The lens 808 may be aimed to capture environmental data (e.g., light). The lens 808 may be wide-angle lenses and/or fish-eye lenses (e.g., lenses capable of capturing a wide field of view). The lens 808 may be configured to capture and/or focus the light for the capture device 804. Generally, the image sensor 822 is located behind the lens 808. Based on the captured light from the lens 808, the capture device 804 may generate a bitstream and/or video data.

The communications module 816 may be configured to implement one or more communications protocols. For example, the communications module 816 and the wireless interface 818 may be configured to implement one or more of, IEEE 802.11, IEEE 802.15, IEEE 802.15.1, IEEE 802.15.2, IEEE 802.15.3, IEEE 802.15.4, IEEE 802.15.5, IEEE 802.20, Bluetooth®, and/or ZigBee. In some embodiments, the wireless interface 818 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera 800 is implemented as a wireless camera, the protocol implemented by the communications module 816 and wireless interface 818 may be a wireless communications protocol. The type of communications protocols implemented by the communications module 816 may be varied according to the design criteria of a particular implementation.

The communications module 816 and/or the wireless interface 818 may be configured to generate a broadcast signal as an output from the camera 800. The broadcast signal may send the video data VIDOUT and/or the control signal(s) CTRL to external devices. For example, the broadcast signal may be sent to a cloud storage service (e.g., a storage service capable of scaling on demand). In some embodiments, the communications module 816 may not transmit data until the processor/SoC 802 has performed video analytics to determine that an object is in the field of view of the camera 800.

In some embodiments, the communications module 816 may be configured to generate a manual control signal. The manual control signal may be generated in response to a signal from a user received by the communications module 816. The manual control signal may be configured to activate the processor/SoC 802. The processor/SoC 802 may be activated in response to the manual control signal regardless of the power state of the camera 800.

In some embodiments, the camera 800 may include a battery 820 configured to provide power for the various components of the camera 800. The multi-step approach to activating and/or disabling the capture device 804 based on the output of the motion sensor 814 and/or any other power consuming features of the camera 800 may be implemented to reduce a power consumption of the camera 800 and extend an operational lifetime of the battery 820. A motion sensor of the sensors 814 may have a very low drain on the battery 820 (e.g., less than 10 μW). In an example, the motion sensor of the sensors 814 may be configured to remain on (e.g., always active) unless disabled in response to feedback from the processor/SoC 802. The video analytics performed by the processor/SoC 802 may have a large drain on the battery 820 (e.g., greater than the motion sensor 814). In an example, the processor/SoC 802 may be in a low-power state (or power-down) until some motion is detected by the motion sensor of the sensors 814.

The camera 800 may be configured to operate using various power states. For example, in the power-down state (e.g., a sleep state, a low-power state) the motion sensor of the sensors 814 and the processor/SoC 802 may be on and other components of the camera 800 (e.g., the image capture device 804, the memory 806, the communications module 816, etc.) may be off. In another example, the camera 800 may operate in an intermediate state. In the intermediate state, the image capture device 804 may be on and the memory 806 and/or the communications module 816 may be off. In yet another example, the camera 800 may operate in a power-on (or high power) state. In the power-on state, the sensors 814, the processor/SoC 802, the capture device 804, the memory 806, and/or the communications module 816 may be on. The camera 800 may consume some power from the battery 820 in the power-down state (e.g., a relatively small and/or minimal amount of power). The camera 800 may consume more power from the battery 820 in the power-on state. The number of power states and/or the components of the camera 800 that are on while the camera 800 operates in each of the power states may be varied according to the design criteria of a particular implementation.

In some embodiments, the camera 800 may include a keypad, a touch pad (or screen), a doorbell switch, and/or other human interface devices (HIDs) 828. In an example, the sensors 814 may be configured to determine when an object is in proximity to the HIDs 828. In an example where the camera 800 is implemented as part of an access control application, the capture device 804 may be turned on to provide images for identifying a person attempting access, and illumination of a lock area, and/or for an access touch pad may be turned on.

In various embodiments, a low cost 3D sensing platform may be provided. The low cost 3D sensing platform may facilitate development of intelligent access control systems and smart security products such as smart video doorbells and door locks, payment systems, alarm systems, etc. In various embodiments, the low cost 3D sensing platform may include a vision system on chip (SoC), structured light projector, and RGB-IR rolling shutter image sensor. In various embodiments, an RGB-IR CMOS image sensor may be utilized to obtain both a visible light image, for viewing and facial recognition, and an infrared (IR) image for depth sensing. In an example, the vision SoC may provide depth processing, anti-spoofing algorithms, 3D facial recognition algorithms, and video encoding on a single chip.

In various applications, the low cost 3D sensing platform in accordance with embodiments of the invention may significantly reduce system complexity while improving performance, reliability, and security. In an example, the vision SoC in accordance with embodiments of the invention may include, but is not limited to, a powerful image signal processor (ISP), native support for RGB-IR color filter arrays, and advance high dynamic range (HDR) processing, which may result in exceptional image quality in low-light and high-contrast environments. In an example, the vision SoC in accordance with embodiments of the invention may provide an architecture that delivers computational power for liveness detection and 3D facial recognition, while running multiple artificial intelligence (AI) algorithms for advanced features such as people counting and anti-tailgating.

In various embodiments, system cost may be reduced by using an RGB-IR rolling shutter sensor (e.g., one sensor and one lens versus two sensors and two lenses, and rolling shutter vs. global shutter). By controlling the structured light projector through software, the time sequence may be adjusted easily, providing improved flexibility. Power savings may be realized because the structured light projector may be used briefly by the software.

In various embodiments, a low cost structured light based 3D sensing system may be implemented. In an example, the 3D information may be used for 3D modeling and liveness determination. In an example, the low cost structured light based 3D sensing system may be used to unlock a door, disarm an alarm system, and/or allow "tripwire" access to a restricted region (e.g., of the garden, the garage, the house, etc.). In one example, the low cost structured light based 3D sensing system may be configured to recognize gardener/pool maintenance person and inhibit triggering an alarm. In another example, the low cost structured light based 3D sensing system may be configured to limit access to certain times and days of the week. In another example, the low cost structured light based 3D sensing system may be configured to trigger an alarm upon recognition of certain objects (e.g. restraining order is out against ex-spouse, alert 911 if that person is detected). In another example, the low cost structured light based 3D sensing system may be configured to allow alarm system re-programming privilege based on video/audio identification (e.g., only person X or Y is permitted to change access level or policy, add users, etc. even if the correct password is entered).

The functions illustrated by the diagrams of FIGS. 1-12 may be implemented utilizing one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    an RGB-IR rolling shutter image sensor;
    a structured light projector; and
    a control circuit configured to control an exposure time of said RGB-IR rolling shutter image sensor and a turn on time of said structured light projector to obtain a structured light pattern in images captured by said RGB-IR rolling shutter image sensor, wherein said control circuit is configured to (i) determine when a last line of said RGB-IR rolling shutter image sensor begins a respective exposure time and (ii) control the structured light projector to turn on the structured light pattern for a predefined period of time when the last line of said RGB-IR rolling shutter image sensor begins the respective exposure time.

2. The apparatus according to claim 1, wherein said control circuit is further configured to:
    receive a first signal from the RGB-IR rolling shutter image sensor, the first signal is configured to provide at least one of an indication of when said last line of said RGB-IR rolling shutter image sensor begins the respective exposure time and information from which a start of the respective exposure time can be calculated using a predefined formula; and
    upon receiving the first signal, send a second signal to the structured light projector to turn on the structured light pattern for a predefined period of time.

3. The apparatus according to claim 2, wherein said control circuit comprises a timer and is configured to program said time to control an on-time of said structured light projector in response to said second signal.

4. The apparatus according to claim 1, further comprising an image signal processing circuit configured to process images captured by said RGB-IR rolling shutter image sensor, wherein said image signal processing circuit splits image data received from said RGB-IR rolling shutter image sensor into color image data and infrared (IR) image data.

5. The apparatus according to claim 4, wherein the color image data comprises at least one of RGB or YUV color space data, and the IR image data comprises one or more of monochrome image data and the structured light pattern.

6. The apparatus according to claim 5, wherein the control circuit is further configured to:
    analyze the IR image data to obtain 3D information for a field of view of said RGB-IR rolling shutter image sensor; and
    analyze the IR image data and the color image data to obtain one or more features in the field of view of said RGB-IR rolling shutter image sensor.

7. The apparatus according to claim 4, wherein the control circuit is further configured to:
    generate one or more control signals in response to analyzing the images captured by said RGB-IR rolling shutter image sensor; and
    control one or more features of a security system in response to the one or more control signals.

8. The apparatus according to claim 7, wherein the one or more features of said security system comprise one or more of a door lock, an alarm system, a controlled access system, and a payment system.

9. The apparatus according to claim 1, wherein said apparatus comprises a low power camera.

10. The apparatus according to claim 1, wherein the control circuit is configured to perform facial recognition and liveness determination.

11. The apparatus according to claim 1, wherein said structured light projector comprises:
    an array of vertical-cavity surface-emitting lasers configured to generate a laser light pattern; and a lens configured to decompose the laser light pattern to a dense dot pattern array.

12. The apparatus according to claim 11, wherein said array of vertical-cavity surface-emitting lasers emits light having a wavelength in an 800 to 1000 nanometers range.

13. A method of implementing a low-cost structured-light based 3D sensing system comprising:
setting an exposure time of an RGB-IR rolling shutter image sensor based on a predetermined value;
determining when a last line of said RGB-IR rolling shutter image sensor begins a respective exposure time; and
when the last line of said RGB-IR rolling shutter image sensor begins the respective exposure time, sending a control signal to turn on a structured-light projector to project a structured light pattern for a predetermined period of time.

14. The method according to claim 13, further comprising:
programming a timer to said predetermined period of time for controlling an on-time of said structured-light projector; and
in response to receiving a signal from said RGB-IR rolling shutter image sensor indicating that said last line of said RGB-IR rolling shutter image sensor is starting the respective exposure time, triggering the timer to turn on said structured-light projector.

15. The method according to claim 13, further comprising:
programming a timer to said predetermined period of time for controlling an on-time of said structured-light projector;
determining a trigger time for triggering the timer to turn on said structured-light projector in response a signal received from said RGB-IR rolling shutter image sensor providing information from which a start of the respective exposure time of said last line of said RGB-IR rolling shutter image sensor can be calculated using a predefined formula; and
triggering the timer to turn on said structured-light projector at said trigger time.

16. The method according to claim 13, further comprising:
analyzing one or more images captured by said RGB-IR rolling shutter image sensor;
generate one or more control signals in response to a result of analyzing said one or more images; and
controlling one or more features of a security system in response to the one or more control signals.

17. The method according to claim 16, wherein analyzing said one or more images captured by said RGB-IR rolling shutter image sensor comprises applying an artificial neural network for at least one of face detection and facial recognition.

18. The method according to claim 17, further comprising:
controlling said one or more features of said security system in response to said facial recognition.

19. The method according to claim 18, wherein the one or more features of said security system comprise one or more of a door lock, an alarm system, a controlled access system, and a payment system.

20. An apparatus comprising:
an interface configured to communicate with an RGB-IR rolling shutter image sensor and a structured light projector; and
a control circuit configured to control an exposure time of said RGB-IR rolling shutter image sensor and a turn on time of said structured light projector to obtain a structured light pattern in images captured by said RGB-IR rolling shutter image sensor, wherein said control circuit is configured to receive a first signal from said RGB-IR rolling shutter image sensor via said interface, the first signal is configured to provide at least one of an indication of when a last line of said RGB-IR rolling shutter image sensor begins a respective exposure time and information from which a start of the respective exposure time can be calculated using a predefined formula, and upon receiving the first signal, send a second signal via said interface to the structured light projector to turn on the structured light pattern for a predefined period of time.

* * * * *